(12) United States Patent
Morard et al.

(10) Patent No.: US 10,803,673 B2
(45) Date of Patent: Oct. 13, 2020

(54) METHOD OF NON-DESTRUCTIVE TESTING BY RIGHTING

(71) Applicant: SAFRAN, Paris (FR)

(72) Inventors: Vincent Jerome Morard, Moissy-Cramayel (FR); Lionel Christian Jean-Loic Gay, Moissy-Cramayel (FR)

(73) Assignee: SAFRAN, Paris (FR)

( * ) Notice: Subject to any disclaimer, the term of this patent is extended or adjusted under 35 U.S.C. 154(b) by 52 days.

(21) Appl. No.: 16/074,245

(22) PCT Filed: Jan. 31, 2017

(86) PCT No.: PCT/FR2017/050216
§ 371 (c)(1),
(2) Date: Jul. 31, 2018

(87) PCT Pub. No.: WO2017/134379
PCT Pub. Date: Aug. 10, 2017

(65) Prior Publication Data
US 2020/0043245 A1 Feb. 6, 2020

(30) Foreign Application Priority Data
Feb. 1, 2016 (FR) ...................................... 16 50787

(51) Int. Cl.
*G06T 19/20* (2011.01)
*G06T 15/08* (2011.01)

(52) U.S. Cl.
CPC ........ *G06T 19/20* (2013.01); *G06T 2219/021* (2013.01); *G06T 2219/2021* (2013.01)

(58) Field of Classification Search
CPC ................................ G06T 19/20; G06T 15/08
See application file for complete search history.

(56) References Cited

U.S. PATENT DOCUMENTS

| 6,041,132 A * | 3/2000 | Isaacs | G01N 23/046 |
| | | | 378/21 |
| 2004/0125103 A1* | 7/2004 | Kaufman | G06T 15/06 |
| | | | 345/419 |

(Continued)

FOREIGN PATENT DOCUMENTS

FR  3 000 256 A1  6/2014

OTHER PUBLICATIONS

International Search Report dated May 12, 2017 in PCT/FR2017/050216 filed Jan. 31, 2017.

(Continued)

*Primary Examiner* — Yi Yang
(74) *Attorney, Agent, or Firm* — Oblon, McClelland, Maier & Neustadt, L.L.P.

(57) ABSTRACT

A method of non-destructive testing of an aeronautical component, including a righting processing including Generation of a median surface of the component extracted from a tomographic volume, the median surface dividing the component into two parts, Determination of a field of normal vectors normal to the median surface, Flattening of the median surface to form a flattened median surface in a plane, Reconstruction of a righted volume containing the component righted about the flattened median surface, the reconstruction being performed by mapping between voxels of the righted volume along directions orthogonal to the flattened median surface and between voxels of the volume along the normal vectors of the median surface which are associated with these respective orthogonal directions, Analysis of the righted volume thus obtained so as to identify the anomalies of the component.

10 Claims, 10 Drawing Sheets

(56) References Cited

U.S. PATENT DOCUMENTS

| | | | |
|---|---|---|---|
| 2009/0225077 A1 | 9/2009 | Sudarsky et al. | |
| 2012/0105868 A1* | 5/2012 | Nomura | G01B 11/25 |
| | | | 356/610 |
| 2013/0076619 A1* | 3/2013 | Carr | G09G 5/00 |
| | | | 345/156 |
| 2014/0306961 A1* | 10/2014 | Nagata | G06T 19/20 |
| | | | 345/424 |
| 2014/0341660 A1* | 11/2014 | Cheon | B23C 5/109 |
| | | | 407/42 |
| 2015/0130942 A1* | 5/2015 | Fujita | B60R 1/00 |
| | | | 348/148 |
| 2015/0269711 A1* | 9/2015 | Ohishi | G06T 5/002 |
| | | | 382/132 |
| 2015/0366487 A1* | 12/2015 | Ryabov | A61B 5/1171 |
| | | | 348/77 |
| 2015/0379163 A1* | 12/2015 | Wang | G06F 17/10 |
| | | | 703/1 |

OTHER PUBLICATIONS

French Preliminary Search Report dated Nov. 18, 2016 in Patent Application No. FR 1650787 (with English translation of categories of cited documents), 4 pages.

\* cited by examiner

METHOD OF NON-DESTRUCTIVE TESTING BY RIGHTING

GENERAL TECHNICAL FIELD

The invention relates to the field of non-destructive testing (NDT) on industrial components, especially in the field of aeronautics, by means of digital tomographic volumes.

More precisely, the invention relates to improvement of visual testing performed by an operator.

NDT is essential for testing the material health of materials. For example, fan blades which are made of three-dimensionally woven carbon fibre composite, are critical components which must be tested fully. But the fan housing, rectifier, vanes, blades, etc. can also be relevant.

Digital tomographic volumes are obtained by means of tomography, the X-ray generator of which emits a beam passing through the component to be explored, before being analysed, after attenuation, by a detection system. The resulting intermediate image is called a «projection». Acquiring a plurality of projections in different planes of space (with optional pre-processing) and combining them produces a three-dimensional volume of the component with an absorption density value of X-rays at each voxel.

These three-dimensional images allow to display the interior of the component non-destructively.

STATE OF ART

The components to be inspected 10 are made of composite materials by means of three-dimensionally woven carbon fibres and which are then placed in a mould and then injected. The reference 10 applies also both to the physical component and to its three-dimensional representation in the tomographic volume V.

Figure 1:
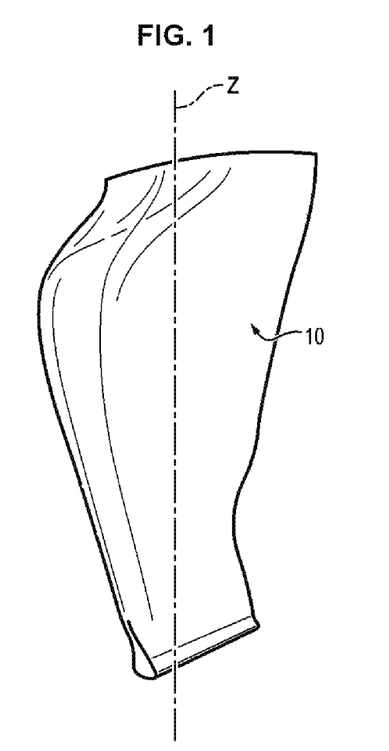
FIG. 1 illustrates a twisted blade.

After injection and machining, some components exhibit a double camber, generally called «twist». The blades of turbines generally have this shape (see FIG. 1): a curvature related to the intrados-extrados profiles, in the form of a crescent moon, and a helical curvature which winds up on itself. By way of example, the helicoidal torsion extends over 70°. These two deformations extend according to a direction, so-called main direction Z.

Figure 2A:
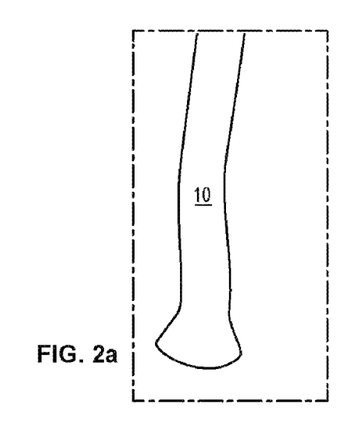
FIGS. 2a to 2d, presented previously, illustrate different views in section of a twisted component.
Figure 2B:
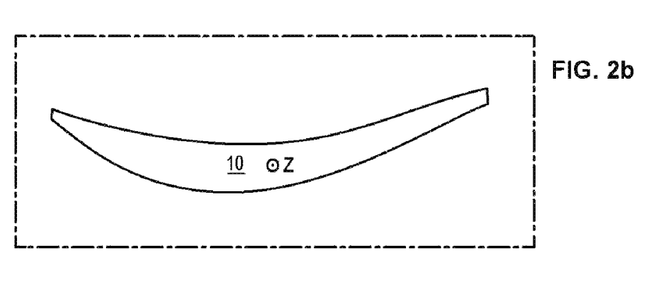
Figure 2C:
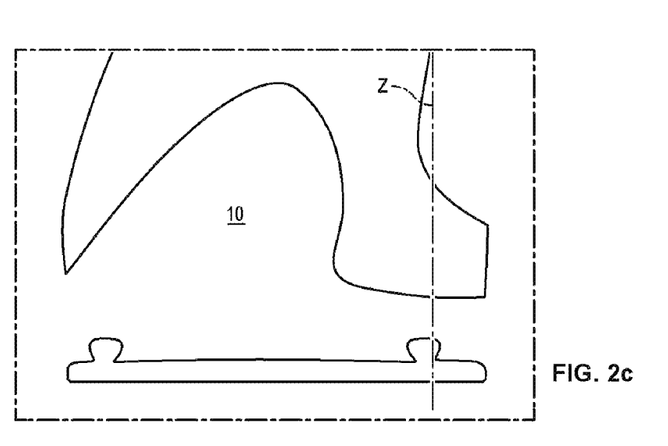
Figure 2D:
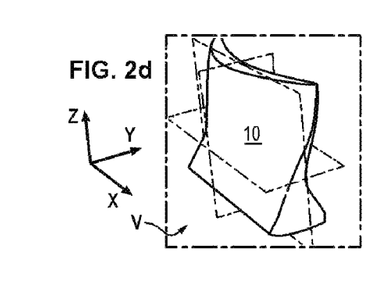

For visual analysis, the operator uses a display software of the three-dimensional tomographic volume V which lets him scan the entire component. FIGS. 2a to 2c illustrate the bidimensional sections of the component which are displayed on the screen, each being oriented according to an axis of the raw image. FIG. 2d illustrates these three planes in a three-dimensional view of the component 10.

The planes presented in FIGS. 2a and 2b are easily exploitable for conducting research into weaving anomalies since the operator can browse the component 10 and have an overall vision. However, the third plane presented in FIG. 2c is more difficult to analysis since the twist of the component does not offer overall vision and the operator must scan this view repeatedly. When a suspect indication is detected in the image, finer analysis must be carried out to confirm or deny the presence of this indication. This consists of adding a plane which this time is aligned as a function of the component and not following the axes of the image. This is a fastidious and very long operation.

Document U.S. Pat. No. 6,041,132 presents a method using a computer-simulated model, called model CAD, for righting the twist of the component. Nevertheless, use of the model CAD for righting the twist is a heavy and restrictive method: when the model is available, it is not defined in the same reference as the tomographic volume and it is necessary to perform a «recalibration». Calculating the recalibration is a non-trivial operation which involves complex methods costly in resources. Also, it can be that the manufactured component does not correspond to the model CAD: the righting carried out will not comply.

Executing such a method is therefore complex.

PRESENTATION OF THE INVENTION

To rectify the disadvantages of the prior art, especially when dispensing with the use of a model CAD, the invention relates to a method of non-destructive testing of an aeronautical component, comprising a preliminary step of obtaining by digital tomography a volume wherein there is a representation of said aeronautical component, the volume being defined by voxels, and characterized in that it comprises a righting processing comprising the following steps:
  (E21) Processing of the tomographic representation, said processing consisting of extracting from said volume the voxels relating to the component only,
  (E22) Generation of a median surface of the component inside the tomographic volume from said extracted volume relating to the component, said median surface dividing the component into two parts,
  (E23) Determination of a field of vectors normal to said median surface,
  (E24) Flattening of said median surface to form a flattened median surface in a plane,
  (E25) Reconstruction of a righted volume containing the component righted around the flattened median surface, said reconstruction being performed by mapping between voxels of the righted volume along directions orthogonal to the flattened median surface and between voxels of the volume along the normal vectors of the median surface associated with these respective orthogonal directions,
  (E3) Analysis of the resulting righted volume to identify the anomalies of the component.

The righted three-dimensional representation is presently oriented according to the main axes of the marker, which makes searching for an anomaly on a display monitor easier, by means of bidimensional sectional planes presented previously. There are multiple advantages for operators: faster analysis, less tiring, fewer operations to carry out, etc.

Intra- and inter-operator variability is decreased. Finally, since the three-dimensional representation is righted, the righted volume consumes fewer computer display resources (random access memory, etc.), since the number of voxels related to air is decreased (the size of the overall volume is smaller).

The invention can comprise the following characteristics, taken alone or in combination:
  the processing step of the tomographic representation (E21) is conducted by segmentation into two classes of voxels as a function of greyscale,
  the component extends according to a main direction, and the median surface extends according to this main direction also,
  the step for generation of the median surface is followed by a low-pass filtering step for eliminating some irregularities,
  the flattening step (E24) is conducted by projection of said median surface on a plane,
  the plane of the flattening step (E24) is selected such that the distortions related to the projection are minimized, the voxel (and even each voxel) of the righted volume is characterized by its distance, so-called orthogonal distance, from a point of said flattened median surface by orthogonal projection, wherein a point of the median surface corresponds to a point of the flattened median surface, and wherein the value of the voxel of the volume located at a distance along the direction defined by the normal vector passing through the point is retrieved, said distance being a function of the so-called orthogonal distance, the reconstruction step (E25) comprises the following sub-steps:

(E251) choice of a voxel in space of the flattened median surface, (E252) calculation of the distance by orthogonal projection, so-called orthogonal distance, of this voxel from the flattened median surface, and determination of the point projected into the flattened median surface, (E253) determination of the point of the non-righted median surface corresponding to the projected point of the non-righted surface, (E254) recovery of the normal vector passing through the corresponding projected point on the non-righted surface, (E255) determination of the value of the voxel located in the direction of the normal vector and at a distance as a function of the value of the orthogonal distance, (E256) deferring of the value of the voxel to the voxel selected in the righted representation, the function between the two distances is a linear function, preferably the identity, no computer modelling of said aeronautical component is used, The invention also provides a computing unit comprising data-processing means and a memory, configured to execute the righting processing such as defined previously. Also, a display monitor can be provided, said monitor displaying the data received by the computing unit, and especially the data of the righted volume.

The invention also provides a computer program product, configured to be executed by a computing unit and execute the righting processing such as defined previously.

PRESENTATION OF FIGURES

Other characteristics, aims and advantages of the invention will emerge from the following description which is purely illustrative and non-limiting and which must be considered with respect to the appended drawings, in which.

DETAILED DESCRIPTION

Figure 3:
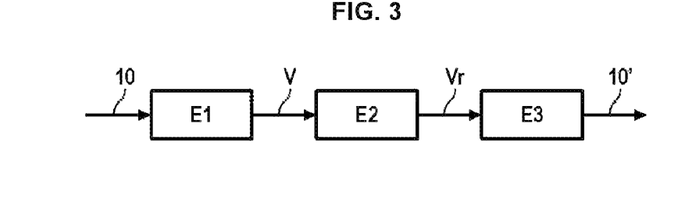
FIGS. 3 and 4 illustrate different steps of a method according to embodiments of the invention.
Figure 4:
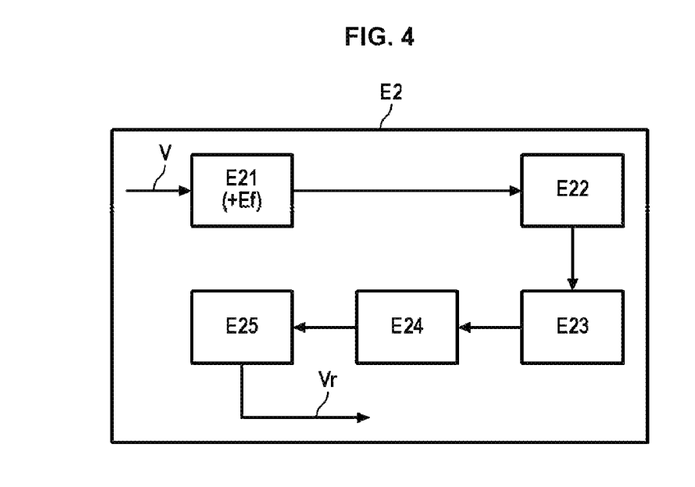

A detailed description of the method of non-destructive testing by righting will now be given in reference to FIGS. 3 and 4.

The component 10 subject to inspection is intended for use in the field of aeronautics, and more precisely in terms of turbomachines. The description and the figures are illustrated for a blade such as presented in the introduction, which comprises a main direction Z. Nevertheless, the method applies to all shapes of component, of non-toric shape. In fact, such a shape could generate difficulties in generating the median surface or projection difficulties, as will be specified hereinbelow.

A preliminary acquisition step E1 by means of a digital tomography imaging system and computing means (not shown in the figures) is conducted so that non-destructive testing inside the component 10 can be executed. This step produces a three-dimensional representation of the component 10 for aeronautics.

The resulting tomography volume V is constituted by voxels Vx each having greyscale. The component 10 is therefore defined inside the volume V by voxels Vx having particular greyscales.

The more specific method of righting E2 will now be described. This method does not involve the use of a model CAD.

The «component 10» will be mentioned inaccurately to designate the tomographic representation of the component 10 which has a material existence. The reference 10' applies to the righted «component 10».

Figure 12:
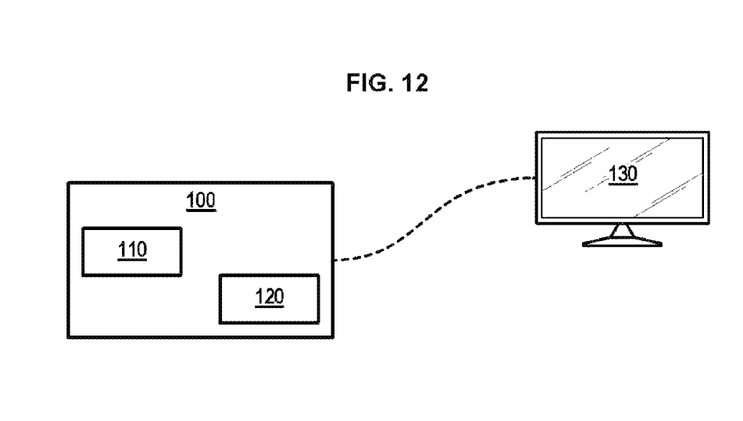
FIG. 12 illustrates a computing unit and a display monitor.

The step E2 is typically conducted by means of a computing unit 100 comprising data-processing means 110 and a memory 120. A display monitor 130 can be provided, configured to display data especially coming from the computing unit 100.

Generation of the Median Surface

The generation step of the median surface can comprise two steps.

First of all, in a first step E21 processing of the representation is executed to extract from the volume the voxels corresponding to the component. A mask M of the component 10 in the tomographic volume V will be mentioned. The mask M consists of gathering all the voxels representing only the component. Extraction of the shape of the component 10 is also mentioned. The mask M is a binary image for which each voxel which composes it has a label 0 or 1: if the voxel belongs to the component 10, it has a value of 1 and if the voxel does not belong to the component 10 it has a value of 0.

From the representation obtained by imaging, an embodiment consists of segmenting the voxels into two categories: air or matter. The voxels classified as «matter» are those effectively belonging to the component 10 for aeronautics, and the voxels classified as «air» (or «vacuum») are those not belonging to the component for aeronautics, but form a volume of air, additional to the volume of the component.

This separation can be done by means of greyscales, by selecting a segmentation threshold.

Another method consists of calculating the histogram of the greyscales of the tomographic volume and maximizing the interclass variance of this histogram to define the optimal threshold which separates the air voxels from the matter voxels (see reference [1]). Other methods of automatic thresholding are possible (see reference [2]).

Once the mask is obtained from the preceding step E21, the method comprises a generation step E22 of a median surface SM from said mask M.

The median surface SM is a surface which divides the component 10 contained in the tomographic volume V into two parts, that is, more exactly which divides the mask M into two three-dimensional volumes (since the median surface SM is calculated from the mask M).

Figures 5, 6:
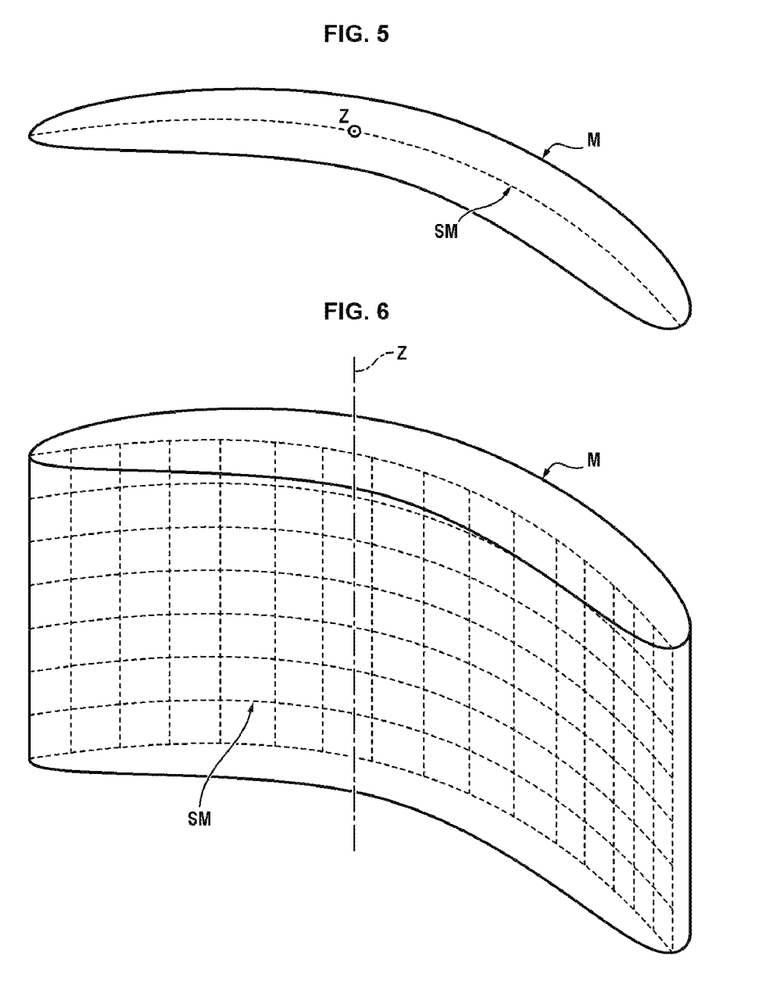
FIGS. 5 and 6 illustrate illustrations of median axes and median surface, respectively in two and three dimensions.

Median surface SM means a surface which, in a transversal orthogonal plane, is equidistant from the two ends of the component. FIG. 5 illustrates in two dimensions a median curve. The median surface SM is composed by the set of median curves, as shown in FIG. 6.

In other terms, the median surface SM passes through the centre of the component 10.

To have a well-defined median surface SM, it is preferable that the component 10 has an extension in one direction, here the direction Z. The median surface SM extends according to this direction Z. A toric component could generate a toric median surface, this which makes the following steps of the method complex.

The median surface SM can be calculated in different ways. Automatic analysis methods of the geometry of the component (the median surface SM must cut the component 10 in two) are suitable, or else more complex algorithms for extracting the median axis in two dimensions or the three-dimensional median surface (see reference [3] and [4]).

Advantageously, a later filtering step Ef is applied to smooth and even out the median surface SM and limit irregularities. Low-pass filtering, for example of Gaussian type, can be employed.

The importance of a smooth surface is extraction of normal vectors, which forms the following step.

Determination of a Field of Normal Vectors

Figure 7:
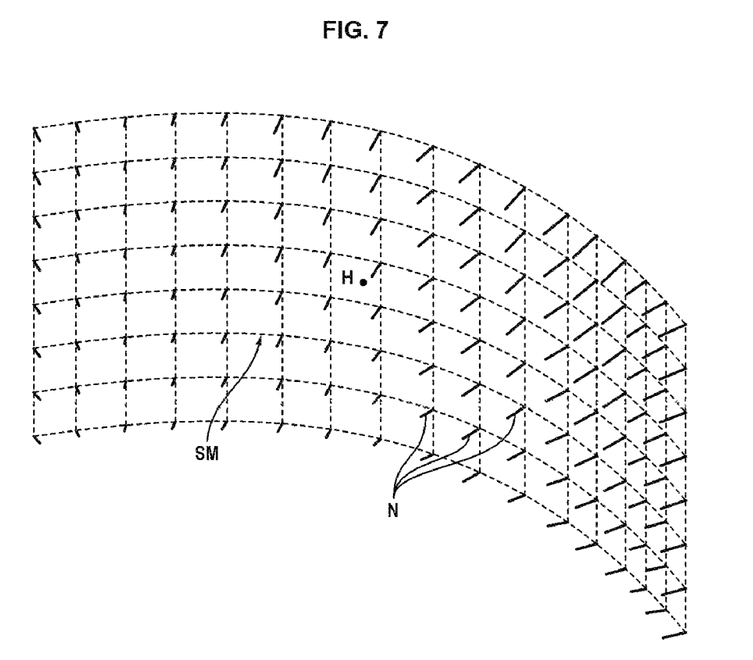
FIG. 7 illustrates a field of normal vectors on a median surface according to the invention.

After the generation step E22 of the median surface, a determination step E23 of a field of normal vectors N is conducted (see FIG. 7). Normal vector N means a vector oriented and orthogonal to the median surface SM at the placement of the origin of the vector. Unitary vectors are favored, even if any standard can be suitable.

The aim of the field of vectors N is to know the initial search direction of the different voxels of the volume V to be inserted into a righted volume Vr, once the median surface SM is flattened. This will be explained in more detail below.

An example of calculation of a normal vector N at a given point H on the surface consists of extracting a set of points from the surface very close to the point H and calculating the inertia of this cloud of points, that is, the variations in space nearby. After having calculated the intrinsic values and the intrinsic vectors of the inertia matrix, the normal vector can be deduced therefrom.

In fact, as the cloud of extracted points corresponds to a surface which locally resembles a plane, the values ($\lambda_i$) and intrinsic vectors ($v_i$) with $i \in \{1,2,3\}$: $(v_1, \lambda_1)$, $(v_2, \lambda_2)$ and $(v_3, \lambda_3)$ are organised as follows: $\lambda_1 \approx \lambda_2 \gg \lambda_3$. The vector $v_3$ corresponds therefore to the normal to the required surface at point H. The same process is executed for all the points H belonging to the median surface and the field of vectors N is determined in this way.

Data relative to the field of vectors are stored in a memory and will be used later on.

Flattening of the Median Surface

Figure 8:
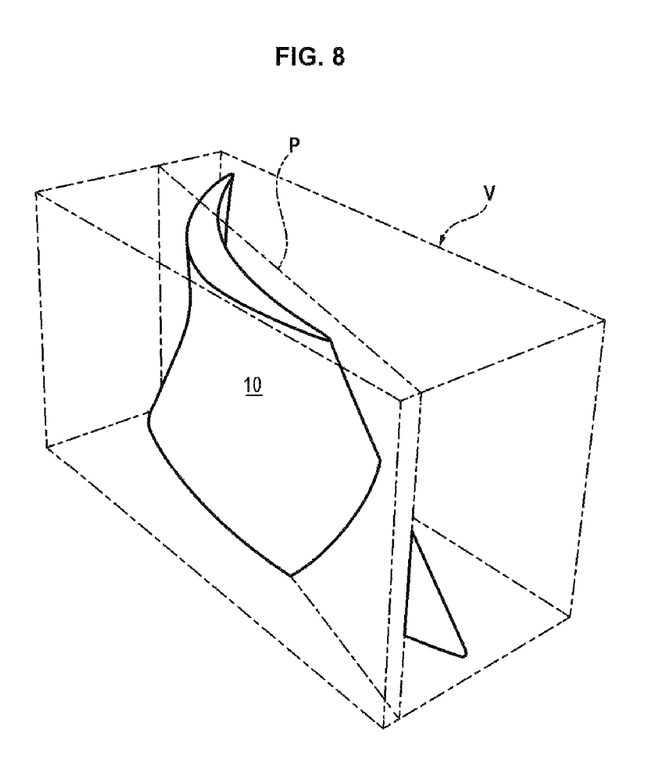
FIG. 8 illustrates a projection plane for flattening the median surface.

The component 10 now undergoes transformations to carry out righting. In a flattening step E24, the median surface SM which is in three-dimensional form is flattened in a plane P, that is, in bidimensional form (see FIG. 8, in which the component 10 is shown, with the plane P, and not the median surface SM). The median surface SM coming from this step E24 is called flattened median surface SMa.

For this, a method consists of selecting a plane which becomes the plane P and projecting the three-dimensional median surface SM in this new reference. The reference has the non-toric form of the component 10 mentioned previously manifests here because it is preferable that each point projected in the plane P has just a single antecedent per side of the plane P as well as each point of the having just a single possible projection. On the contrary, uncertainty would be created during reconstruction of the righted volume, as will be specified later on. Advantageously, the plane is selected so that it minimises distortions related to projection; complementary, said plane can also be selected so that it minimises all the projected distances.

From here on flattened median surface SMa will be used to designate the surface obtained following step E24, and non-flattened median surface SM obtained following step E22.

Righting of the Volume

Finally, the tomographic volume must be reconstructed all over from the flattened median surface SMa. This will be referred to as righted volume Vr.

This reconstruction step E25 involves the generation steps E22 of the median surface, E23 generation of the field of vectors N and E24 flattening.

In this step E25, mapping is set up between a voxel Vx' of the righted volume Vr, along a direction orthogonal to the flattened median surface SMa, and a voxel Vx of the associated tomographic volume V along the normal vector N corresponding to this orthogonal direction. Mapping means that the value of the greyscale of the voxel Vx is implemented in the value of the voxel Vx'.

Righted tomographic volume Vr is used to designate the tomographic volume V obtained on completion of the step E25, and non-righted tomographic volume to designate the tomographic volume obtained on completion of the step E1.

In other terms, mapping is set up between a voxel Vx' of the righted volume Vr and a voxel Vx of the non-righted volume V. For this, the voxel Vx' is characterized by its distance h' from a point A' of said flattened median surface SMa by orthogonal projection (that is, along a direction orthogonal to the flattened median surface SMa and passing through the point A). A point A of the median surface SM corresponds to this point A' and the value of the voxel Vx placed at a distance h as a function of the distance h' along the direction defined by the normal vector N passing through the point A is retrieved.

The definition of the point A' and its mapping A is typically an intermediate to be able to associate the orthogonal direction according to which the distance h' is measured at a normal vector N according to which the distance h is measured.

As mentioned previously, if there are several points the projection of which corresponds to the points A or A', uncertainties are created which complicate reconstruction of the volume.

From here on righted tomographic volume will be used to designate the tomographic volume obtained on completion of the step E25, and non-righted tomographic volume to designate the tomographic volume obtained on completion of the step E1.

In scanning the righted volume Vr by means of the voxels Vx', the set of greyscale values of the tomographic volume V is reintegrated voxel after voxel into the righted volume, finally generating a righted three-dimensional image.

It can be that the mapping of a voxel Vx' of the righted volume does not fall exactly on a voxel Vx of the non-righted volume but between eight voxels Vx. In practice, trilinear interpolation is carried out with each mapping.

FIGS. 9a to 9c and 10 illustrate in two dimensions an embodiment of the reconstruction step.

In a sub-step E251, a voxel Vx' in the righted volume Vr of the flattened median surface SMa is selected.

In a sub-step E252, the distance h' is calculated by orthogonal projection on said flattened median surface. This distance h' is called orthogonal distance. At the same time, the point A' of the flattened median surface corresponding to the projection of Vx' is calculated.

In a sub-step E253, the point A of the non-righted median surface SM corresponding to the point A' of the flattened median surface SMa is determined. For this, it is possible to conduct an intermediate mapping step via the corresponding point of the non-flattened median surface SM.

Figure 9A:
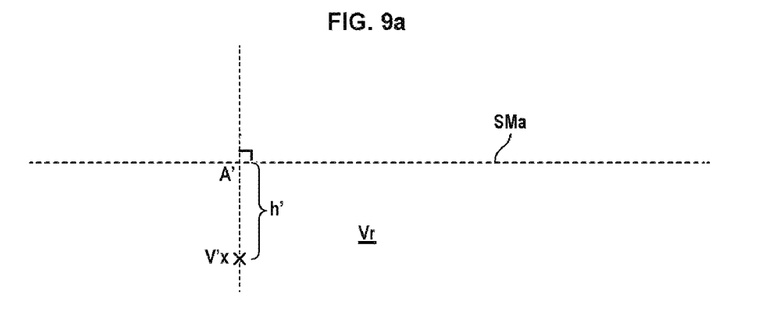
FIGS. 9a to 9c illustrate different steps for reconstructing the righted volume from the flattening of the median surface.

FIG. 9a illustrates the steps above which develop in the righted volume Vr.

In a sub-step E254, the normal vector N passing through the point A is retrieved.

Figure 9B:
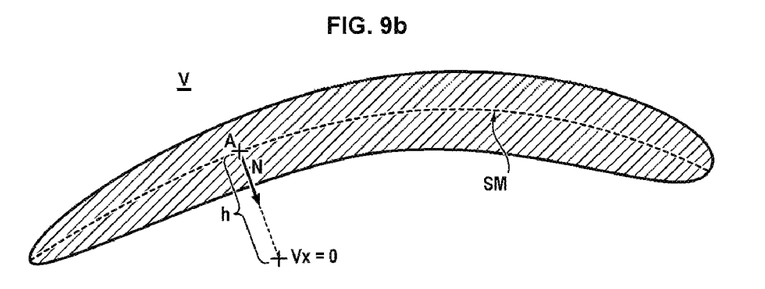

In a sub-step E255, the value of the voxel Vx (in the non-righted tomographic volume V) located along the direction of said normal vector N at a distance h as a function of the orthogonal distance h' is retrieved. FIG. 9b illustrates the steps above which develop in the volume V.

Finally, in a sub-step E256, the value of the voxel Vx of the volume V is assigned to the voxel Vx' of the righted volume Vr.

Figure 9C:
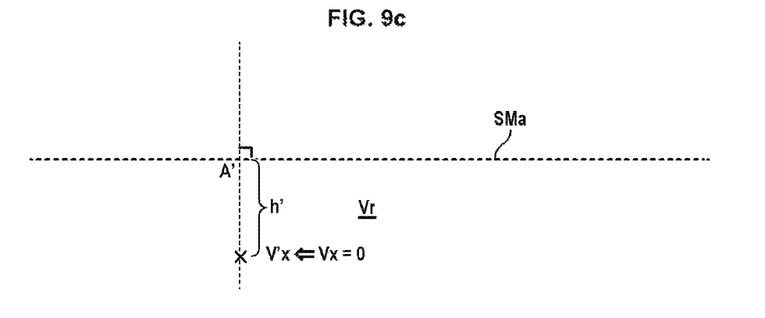

FIG. 9c illustrates this step which develops again in the righted volume.

Preferably, to limit deformations, the function connecting h and h', that is, connecting the distances AVx and A'Vx', is a linear function of h=δh' type. Finally, more preferably, there is δ=1, meaning that the function is the identity and that h'=h: in this way, it is enough to report the same distance.

More generally, the function must preserve the topography of the defects.

Figure 10:
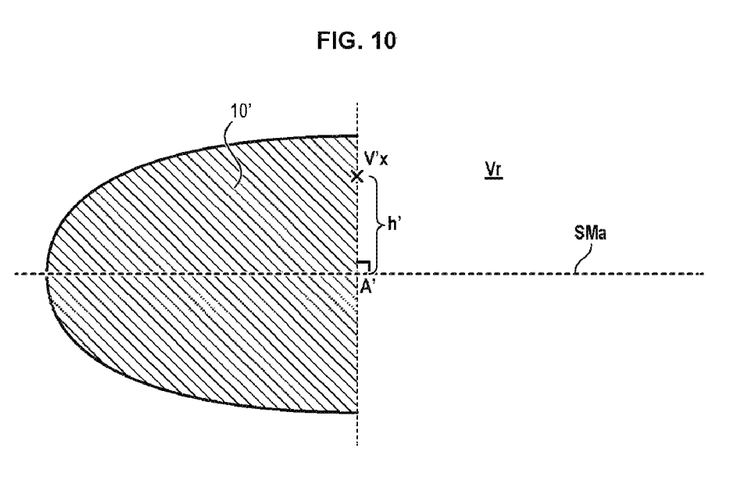
FIG. 10 illustrates a reconstruction of the righted volume underway.

As indicated previously, the steps E251 to E256 are iterative so that the volume V is righted completely. FIG. 10 illustrates this reconstruction by iteration: the righted component 10' is reconstructed voxel Vx' by voxel Vx', by recovery of the values of the respectively associated voxels Vx.

To perform this iteration, the steps E251 and E252 can be repeated for all the points located on the same straight line, such that the steps E253 and E254 are conducted once only. But the steps E255 and E256 are repeated as many times as the steps E251 and E252 have been.

During reconstruction of the volume, it can be that the point Vx in fact corresponds in the non-righted volume to an air voxel Vx'. A zero value can for example be accorded to Vx. To avoid useless calculations, the method can ascertain that the following mappings will be performed for smaller distances h.

Alternatively, the choice of a voxel Vx can be made as a function of an orthogonal direction predetermined previously. This means that in a step E251', it is the point A which is fixed and the straight line orthogonal to the righted median surface passing through A is calculated. Next, in a step E252', a distance h is selected, determining a voxel Vx.

In this embodiment, it is possible to iterate the method by repeating the step E252', preferably by having the value h increased so as to scan the volume in the direction of the exterior of the component 10. Once a voxel Vx is associated with an air voxel Vx', the method can consider that the component has been fully reconstructed according to this direction and the steps E251', etc. are then repeated for another point A.

Figure 11A:
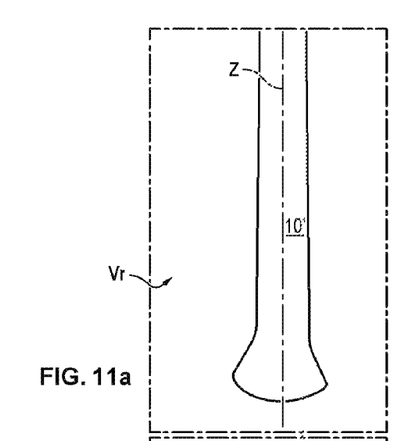
FIGS. 11a to 11d illustrate a righted volume, with a righted component.
Figure 11B:
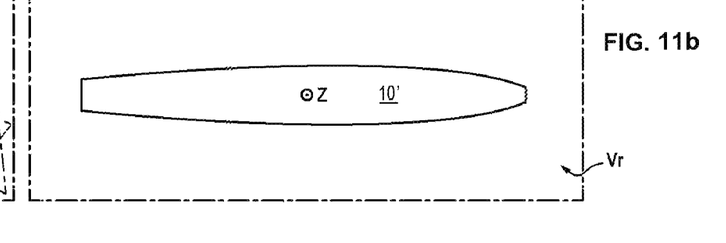
Figure 11C:
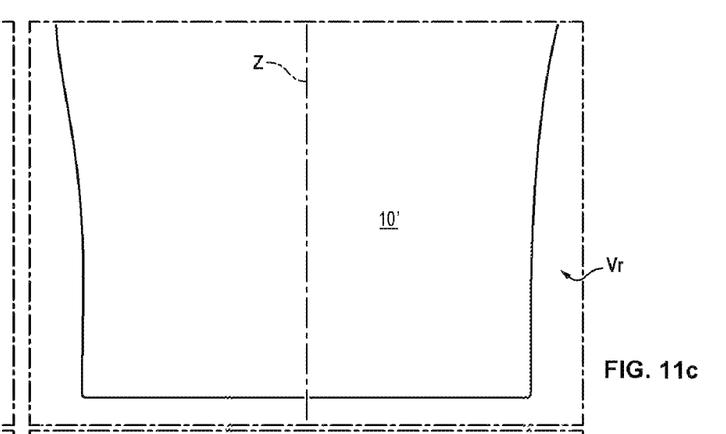
Figure 11D:
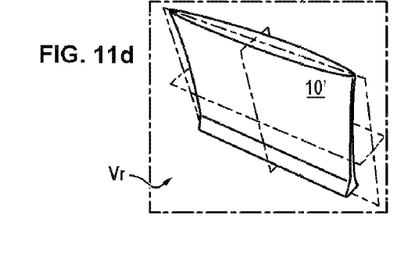

On completion of the reconstruction step E25, a tomographic volume called righted Vr has been generated. FIGS. 11a to 11c illustrate three different planes in orthogonal section in pairs and FIG. 11d illustrates righted the component passed through by these three planes. By comparison with FIG. 3c, this plane coming from the righting is exploitable without particular complication from now on.

Due to the transformations involved in the method (projection and distance report), the topography of the defects is respected, ensuring that no defect disappears during application of the preceding: analysis by an operator on the righted tomographic volume proves more reliable, more stabilised and faster.

Also, because of the righting of the component 10 in the tomographic volume, the size of the file is decreased since the number of air voxels is lower.

Finally, an analysis step E3 such as defined in the introduction is advantageously conducted by an operator, in particular by means of the monitor 130 which receives the data from the computing unit 100 (FIG. 12). From now on this step is faster, more effective, more reliable, less-computationally intensive and has increased inter-operator repeatability.

A computer program product is also defined which can be executed by the data-processing means 110 of the computing unit 100 and which executes the righting processing described previously. In particular, the righted three-dimensional image is stored in the memory 120.

REFERENCES

[1] Nobuyuki Otsu, «A threshold selection method from gray-level histograms», IEEE Trans. Sys., Man., Cyber., vol. 9, 1979, p. 62-66 (DOI 10.1109/TSMC.1979.4310076).
[2] M. Sezgin and B. Sankur, «Survey over image thresholding techniques and quantitative performance evaluation», Journal of Electronic Imaging, vol. 13, no 1, 2003, p. 146-165 (DOI 10.1117/1.1631315).
[3] Hesselink, W. H., & Roerdink, J. B. (2008). Euclidean skeletons of digital image and volume data in linear time by the integer medial axis transform. Pattern Analysis and Machine Intelligence, IEEE Transactions on, 30(12), 2204-2217.
[4] Chaussard, J., Couprie, M., & Talbot, H. (2009, January). A discrete λ-medial axis. In Discrete Geometry for Computer Imagery (pp. 421-433). Springer Berlin Heidelberg.

The invention claimed is:

1. A method of nondestructive testing of an aeronautical component, comprising a preliminary step of obtaining by digital tomography a volume wherein there is a representation of said aeronautical component, the volume being defined by voxels, and a righting processing comprising the following steps:
processing of the tomographic representation, said processing comprising extracting from said volume the voxels relating to the component only,
generating a median surface of the component inside the tomographic volume from said extracted volume relating to the component, said median surface dividing the component into two parts,
determining a field of vectors normal to said median surface, flattening said median surface to form a flattened median surface in a plane, reconstructing a righted volume containing the component righted around the flattened median surface, said reconstructing being performed by mapping between voxels of the righted volume along directions orthogonal to the flattened median surface and between voxels of the volume along the normal vector of the median surface associated with these respective orthogonal directions, analyzing resulting righted volume to identify the anomalies of the component, wherein the mapping includes implementing a value of a greyscale of the voxels of the righted volume in a value of the voxels of the volume along the normal vector.

2. The method of nondestructive testing according to claim 1, wherein the step of generating the median surface is followed by a low-pass filtering step for eliminating some irregularities.

3. The method of non-destructive testing according to claim 1, wherein the flattening step is conducted by projection of said median surface on the plane.

4. The method of non-destructive testing according to claim 1, wherein the plane of the flattening step is selected such that the distances of the projections are minimized.

5. The method of non-destructive testing according to claim 1, wherein the voxel of the righted volume is characterized by its distance, so-called orthogonal distance, from a point of said flattened median surface by orthogonal projection, wherein a point of the median surface corresponds to a point of the flattened median surface, and wherein the value of the voxel of the volume located at a distance along the direction defined by the normal vector passing through the point is retrieved, said distance being a function of the so-called orthogonal distance.

6. The method of non-destructive testing according to claim 5, wherein the function connecting the distance of the voxel of the volume and the so-called orthogonal distance is a linear function.

7. The method of non-destructive testing according to claim 1, wherein no computer modelling of said aeronautical component is used.

8. The method of non-destructive testing according to claim 1, wherein the median surface generated during the generating step is a surface which, in a transverse orthogonal plane, is equidistant from two ends of the component.

9. The method of non-destructive testing according to claim wherein, in the determining step, the normal vector is a vector oriented and orthogonal to the median surface at the placement of the origin of the vector.

10. A computing unit comprising a processor and a memory, configured to execute the righting processing such as defined in claim 1.

* * * * *

UNITED STATES PATENT AND TRADEMARK OFFICE
CERTIFICATE OF CORRECTION

PATENT NO.         : 10,803,673 B2
APPLICATION NO.    : 16/074245
DATED              : October 13, 2020
INVENTOR(S)        : Vincent Jerome Morard et al.

Page 1 of 1

It is certified that error appears in the above-identified patent and that said Letters Patent is hereby corrected as shown below:

In the Claims

In Column 8, Line 53, Claim 1, delete "nondestructive" and insert -- non-destructive --.

In Column 9, Line 16, Claim 2, delete "nondestructive" and insert -- non-destructive --.

In Column 10, Line 21, Claim 9, delete "claim" and insert -- claim 1, --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*